Oct. 11, 1932.   M. H. STARR   1,882,456
MEANS FOR INCREASING THE CAPACITY OF DIAL SCALES
Filed April 24, 1926   6 Sheets-Sheet 1

INVENTOR
Morton H. Starr
BY
ATTORNEY

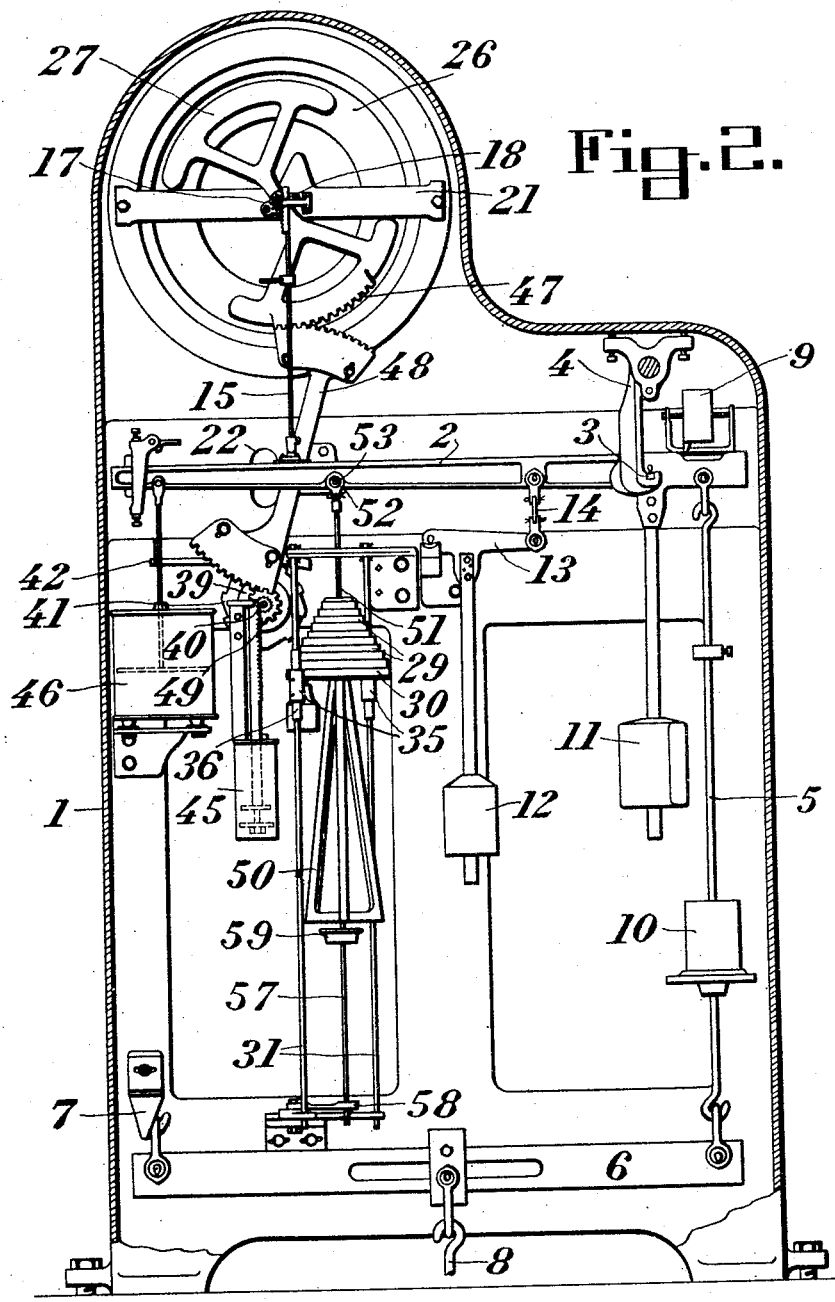

Oct. 11, 1932.  M. H. STARR  1,882,456
MEANS FOR INCREASING THE CAPACITY OF DIAL SCALES
Filed April 24, 1926  6 Sheets-Sheet 3
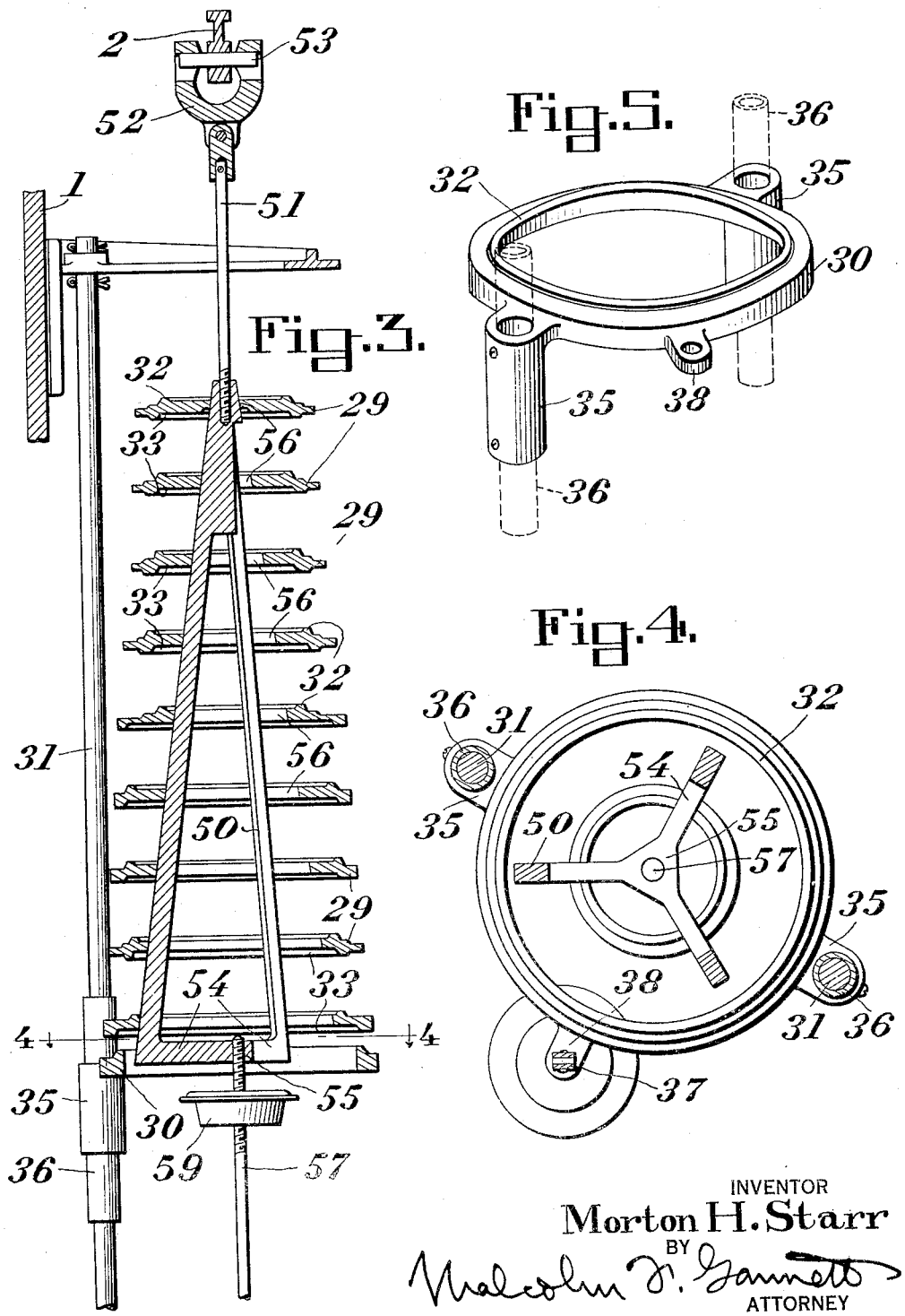
INVENTOR
Morton H. Starr
BY
Malcolm F. Gannett
ATTORNEY Oct. 11, 1932.  M. H. STARR  1,882,456
MEANS FOR INCREASING THE CAPACITY OF DIAL SCALES
Filed April 24, 1926  6 Sheets-Sheet 4

INVENTOR
Morton H. Starr
BY
Malcolm J. Gannett
ATTORNEY

Oct. 11, 1932. M. H. STARR 1,882,456
MEANS FOR INCREASING THE CAPACITY OF DIAL SCALES
Filed April 24, 1926 6 Sheets-Sheet 5

INVENTOR
Morton H. Starr
BY
ATTORNEY

Oct. 11, 1932. M. H. STARR 1,882,456
MEANS FOR INCREASING THE CAPACITY OF DIAL SCALES
Filed April 24, 1926 6 Sheets-Sheet 6
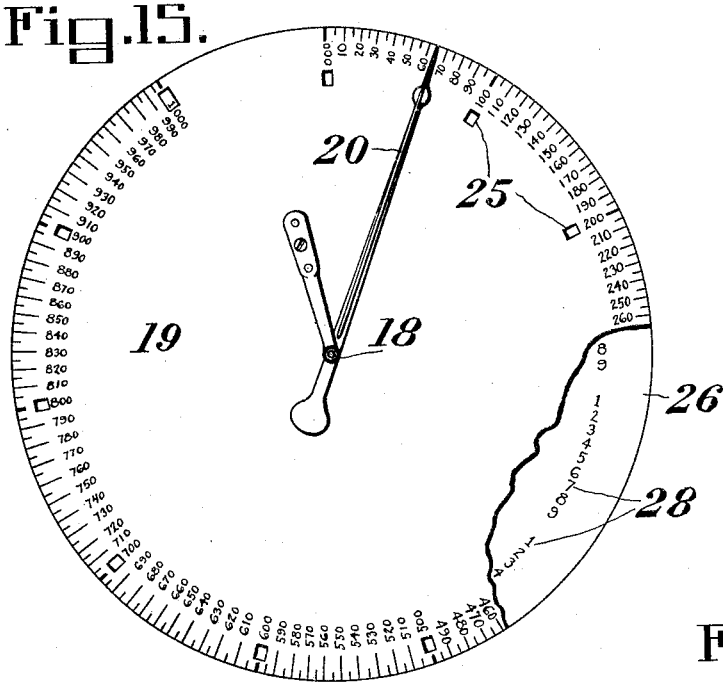
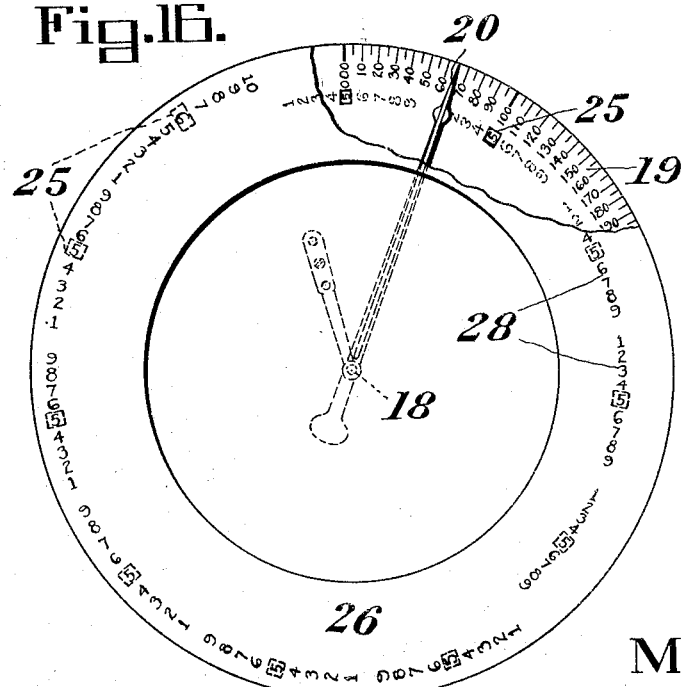
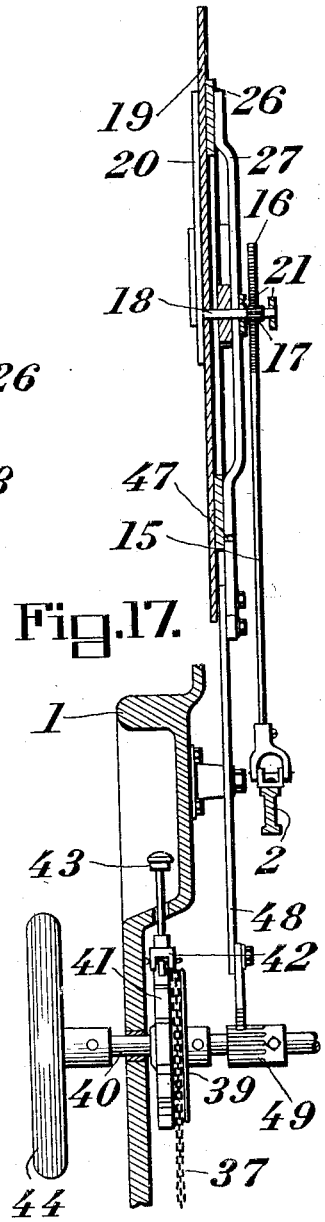
INVENTOR
Morton H. Starr
BY
Malcolm J. Gannett
ATTORNEY Patented Oct. 11, 1932

1,882,456

UNITED STATES PATENT OFFICE

MORTON H. STARR, OF ST. JOHNSBURY, VERMONT, ASSIGNOR TO E. AND T. FAIRBANKS AND COMPANY, OF ST. JOHNSBURY, VERMONT, A CORPORATION OF VERMONT

MEANS FOR INCREASING THE CAPACITY OF DIAL SCALES

Application filed April 24, 1926. Serial No. 104,255.

This invention relates to weight-indicating mechanisms in which scale dials are provided with auxiliary counter balances and auxiliary movable dials so that the capacity of a scale can be increased or multiplied and the total loads determined by reading the main dials in connection with the auxiliary dials.

The prime object of the present invention is to provide a mechanism for transferring total capacity weights to and from a weight receiver carried by the weigh beam of a scale whereby the actuation of the weights to increase or decrease the capacity of the dial will be efficient under all conditions of service.

Another object of the invention is the provision of an improved weigh beam counterpoise having the form of a skeleton cone adapted to carry a plurality of counter weights of varying diameters.

Other objects will be in part obvious in connection with the following description and will be in part pointed out in connection therewith.

The invention accordingly comprises the features of construction, combination of elements, and arrangement of parts which will be exemplified in the construction hereinafter set forth, and the scope of the application of which will be indicated in the claims.

For a complete understanding of the nature and objects of the invention, reference is had to the following detailed description and to the accompanying drawings wherein—

Fig. 2 is a rear view of the scale mechanism, illustrating the parts in the position they assume when the auxiliary weights are removed from the counterpoise, the housing of the weight indicating mechanism being shown in section;

Fig. 3 is a vertical transverse section through the counterpoise structure, as seen from the line 3—3 of Fig. 1;

Fig. 4 is a horizontal section taken approximately on the line 4—4 of Fig. 3, showing the lower portion of the counterpoise;

Fig. 5 is a detail perspective view of a portion of the means employed for carrying the counter weights;

Figure 1:
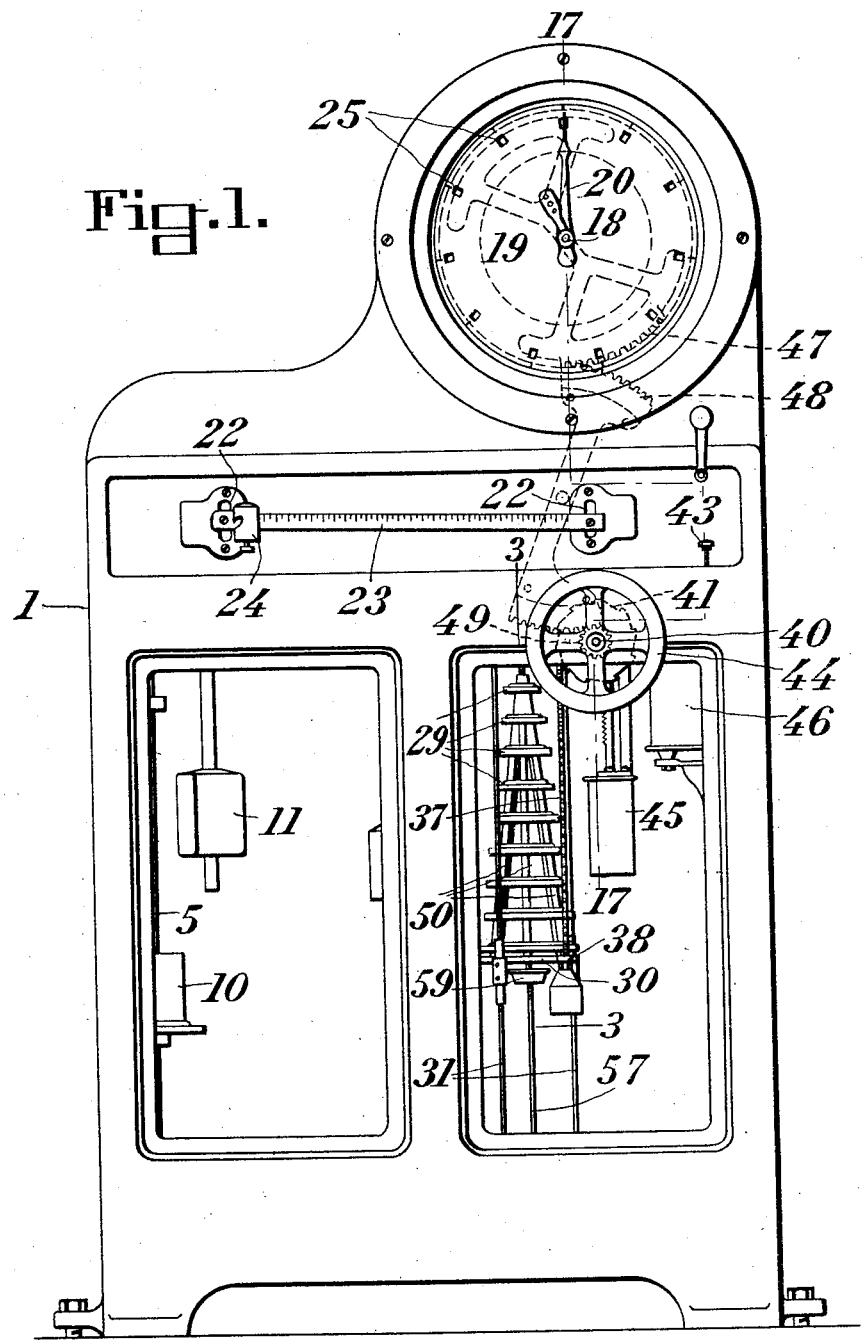
Figure 1 is a front view of a dial scale embodying this invention, the parts illustrated being shown in the position they assume when all of the counterpoise weights are applied to the counterpoise.
Figure 6:
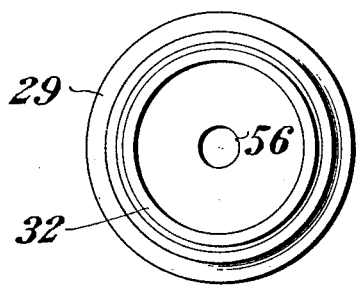
Figure 7:
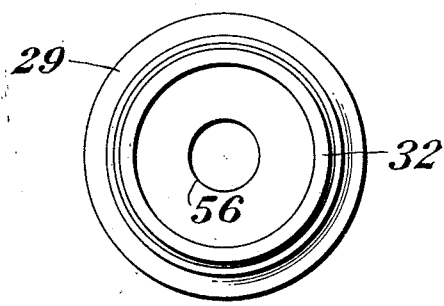
Figure 8:
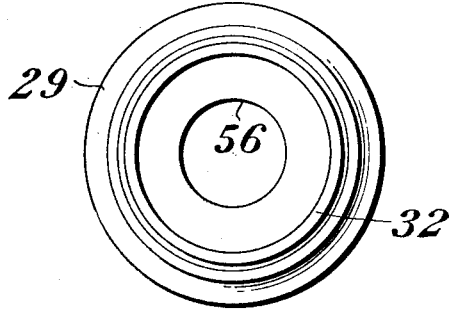

Figs. 6 to 14 inclusive are detail views of the counterweights;

Fig. 15 is an enlarged view of the dials, illustrating a typical arrangement of graduations, the dials being shown in the position they assume when the weight indicating mechanism is arranged in the manner disclosed by Fig. 2;

Fig. 16 is a similar view showing the auxiliary dial in the position it assumes when a load greater than the initial capacity of the main dial is to be weighed, a fragmentary portion of the main dial being shown; and Fig. 17 is a detail section taken on the line 17—17 of Fig. 1, illustrating the essential parts of the dial mechanism.

Referring now to the drawings, the weight indicating mechanism is mounted in, and carried by, a housing 1. A weigh beam 2, fulcrumed on a bearing 3 mounted in a bracket 4 depending from the upper part of the housing, is connected by a rod 5 to one end of a shelf lever 6. The lever is mounted in the bottom of the housing and has its opposite end pivotally suspended from a bracket 7, while intermediate its length, the lever may be connected to the platform levers (not shown) by means of a rod 8. The rear end of the weigh beam carries an adjustable balance ball 9, while the rod 5 is provided with a balance weight cup 10.

The lever system may be such as is employed in the ordinary form of platform scale, and as the load on the platform increases, the beam assumes new positions of rest, a counterpoise pendulum 11, rigidly attached to the beam, always offering a resistance, within the limits of its capacity, sufficient to maintain the beam in equilibrium. A secondary pendulum 12 is pivoted to a bracket 13 supported by the housing and has link connections 14 with the beam. The purpose of the pendulum 12 is to compensate for any inequalities in the weight indicating mechanism and to also provide a safeguard against change of balance due to the housing being out of level, or the dial indicator out of plumb.

The movement of the beam is communicated through a rod 15 having a rack 16, to a pinion 17 on a shaft 18 disposed coaxially with the graduated dial 19. The forward end of the shaft 18 carries an indicator 20 which will thus be rotated to assume a position on the dial corresponding to the relative position of the beam. A movement of the indicator over the whole graduated portion of the dial, which portion is slightly less than the whole circumference of the dial, corresponds to a movement of the beam throughout its full range of motion. The shaft 18 is supported by a bracket 21 fixed to the housing.

The front of the housing adjacent to the beam 2 is provided with a pair of spaced slots 22. Attached to the beam by means of lugs extending through the slots, is a graduated bar 23, which is disposed in a recessed portion of the front wall of the housing. This bar is used for taking care, and it is therefore provided with a poise 24. Furthermore, the bar permits hand weighing up to the full capacity of the dial, but entirely independent of the dial. When the device is being used for weighing purposes in which no tare readings are required but dial indications are desired, the poise 24 is set at zero position, as shown by Fig. 1.

The dial 19 is graduated around its periphery into any number of divisions, and at uniformly spaced intervals around its periphery windows 25 are cut through the dial. These windows are arranged inside of the graduations in proximity to the graduation numbers.

An auxiliary dial 26, in the form of a sheet metal ring having a diameter substantially coinciding with the diameter of the dial 19, is coaxially mounted behind the dial 19, being positioned adjacent thereto. The dial 26 is adapted to be rotated, and therefore it may be supported in any convenient manner, such as by a spider 27 that is revolvably mounted on the shaft 18.

On the face of the dial 26 there is placed a plurality of series of numbers 28, which are so arranged in spaced relation to each other that the corresponding numbers of each series will be displayed consecutively through their corresponding windows as the dial 26 is rotated. This arrangement of the numbers is such that with the dial 26 in normal position, the only number that will be displayed through the windows of the dial 19 from the back dial will be the number 1 in the last window (see Fig. 15).

In the illustrative embodiment of the invention, the dial 19 appears as the exact equivalent of a simple dial graduated 0—1000. Eleven windows are formed in the dial 19 and eleven series of numbers are positioned on the dial 26 so as to register with the windows of the dial 19, when the dial 26 is rotated. The face of the dial 19, opposite the first window is shown as numbered 000, while the second window is numbered 100, the third window 200, etc., so that opposite the eleventh window, the graduation is numbered 1000, the figure 1, however showing through the window from the rear dial.

Figure 9:
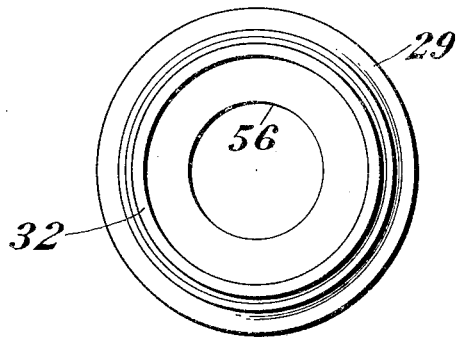
Figure 10:
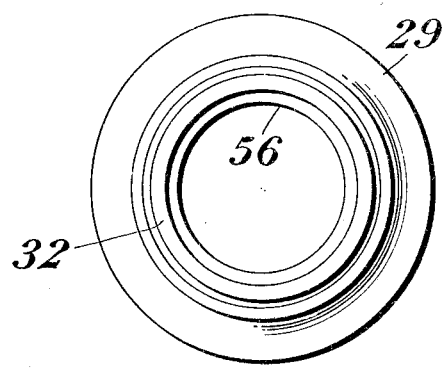
Figure 11:
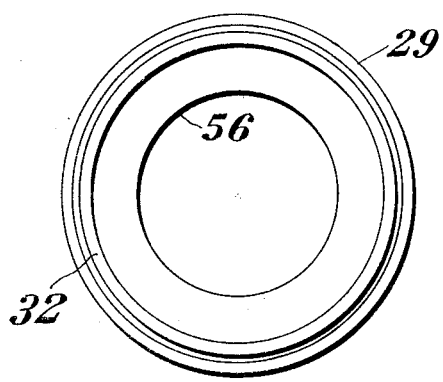
Figure 13:
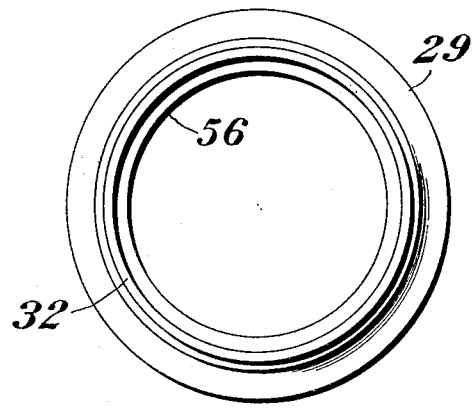
Figure 12:
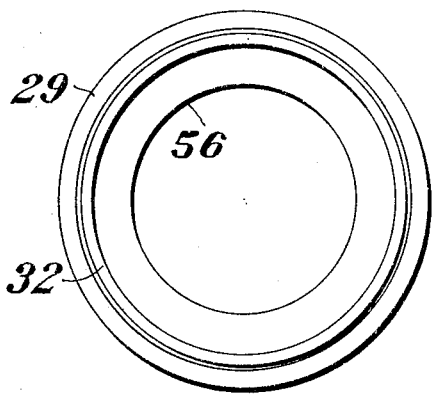

Ten of the series of numbers on the face of the dial 26 each contain the numerals 1 to 9 inclusive and the eleventh series has the figure 10 following the figure 9. This latter series is positioned so that the number 2 occupies the relative position of the number 1 in the other series. In this way, each time the rear dial is stepped around a distance equivalent to the distance between each of the numbers, the capacity of the scale will be increased 1000 pounds. By referring to Fig. 15, it will be noticed that when the dial 26 is positioned for less than 1000 pound readings, the number 1 on the rear dial will be displayed through the last window opening of the dial 19, while blanks will show at all of the other window openings.

In order to multiply the capacity of the scale, auxiliary counterpoise weights 29, are provided. These weights are normally disconnected from the weighing mechanism, as may be seen by referring to Fig. 2, being supported by a carrier 30 that is slidably mounted on a plurality of vertical rods 31 fixed inside the housing. These parts are so arranged that the weights and their carrier will be disposed directly beneath the beam, independently thereof.

The carrier 30 is adapted to descend or ascend when the capacity of the dial is being increased or decreased. On downward movement of the carrier, the weights 29 will be automatically removed therefrom, one at a time, as will be later on explained, while on upward movement of the carrier, the weights will be successively picked up by the carrier.

In order to prevent displacement or disassembly of the weights while they are mounted on the carrier, each of the weights, as well as the carrier, are made in the form of a ring having an annular bead 32 formed on its upper face, such bead being of less diameter than the respective diameters of the weights and the carrier so as to be insertible in an undercut portion 33 that is formed on the lower faces of the weights. In this way, the lowermost weight will seat closely on the carrier, and the remaining weights will nest thereon when the carrier is in raised position.

Figure 14:
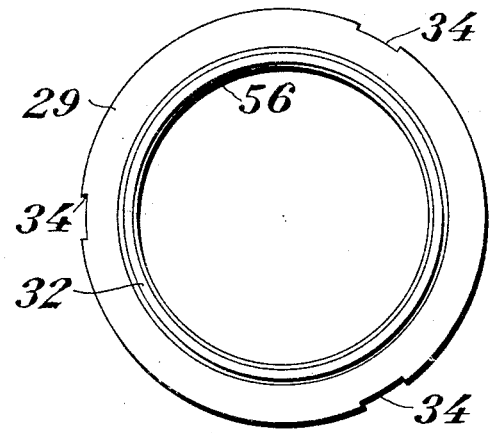

As shown by Fig. 14, the periphery of the weights may have notches 34 formed therein so as to permit such weights to be fixed into a suitable tool when they are being manufactured to prevent them from turning with respect of the tool. The provision of the notches, however, is arbitrary, and such notches serve no purpose during the use of the weights in the scale.

Radially disposed bosses 35 are formed on the periphery of the carrier, and these bosses are apertured for receiving sleeves 36, which latter are fixed tightly in the bosses. The bore of the sleeves is made as smooth as possible so that the carrier can slide on the rods 31 with a minimum amount of friction, and the sleeves are made of sufficient length to prevent rocking of the carrier during the operation of the device.

The movement of the weight carrier is controlled through a chain 37 attached to a radially projecting lug 38 on the periphery of the carrier, such chain having its other end passed around and secured to a drum 39 on a shaft 40 transversely mounted in the housing. A ratchet wheel 41, fixed to the same shaft, is normally engaged by a tooth on an arm 42 that is actuated by a finger piece 43 projecting through the housing. On depressing the finger piece, the carrier 30 will be permitted to descend by gravity. The shaft 40 projects forwardly through the housing and has mounted thereon a hand wheel 44. By operating the hand wheel, the carrier may be raised to any position, or be restored to its initial position, it being held in such positions through the engagement of the toothed arm 42 with the ratchet wheel 41.

A dash pot or other retarding means 45, may be provided to prevent excessively rapid movement of the carrier, and damping means 46 is desirable to prevent undue vibration of the beam 2.

Suitable connections are provided for moving the dial 26 in accordance with the weight carrier 30, such connections comprising a gear segment 47 on a spider portion 27 of the dial, which gear segment engages an idler or gear member 48 that is pivotally supported at its center and is in engagement with a pinion 49 fixed on the shaft 40. The arrangement is such that as the weight carrier descends and thereby rotates the shaft 40, the dial 26 will be rotated through the member 48 being oscillated by the pinion 49. When the dial has been rotated the desired amount by the descent of the weight carrier, the carrier can be stopped by manipulating the arm 42 so that its tooth will engage one of the teeth of the wheel 41.

The number of notches in the wheel 40, in the present instance, is one in excess of the nine numbers comprising each series on the dial 26, the extra notch corresponding to the zero position of the dial 26 when the parts are in the position shown by Fig. 2. As there are nine numbers in each series on the dial 26, and nine weights mounted on the carrier 30, when the downward movement of the carrier is arrested by the engagement of the tooth of the arm with a notch in the wheel 41, the number showing through the windows 25 of the dial 19 will correspond to the number of weights removed from the carrier. This movement of the parts is such as to leave the beam and its connections free from interference and to cause the numbers displayed on the rear dial to be in exact register with the windows 25.

Upon downward movement of the carrier 30, the weights 29 are deposited in succession on a receiver 50, pivotally suspended from the beam 2 by means of a rod 51. The upper end of the rod carries a yoke 52 which is mounted on a pivot 53 fixed in the beam, while the lower end of the rod is threaded into the top of the receiver 50.

By preference, the weight receiver is made in the form of a skeleton cone consisting of three legs suitably connected at their upper extremities to form a conical top portion, and having their lower extremities joined by radially extending arms 54 from a triangular center piece 55. The outer surface of the receiver is machined so as to offer a smooth seat for receiving the weights.

As shown, the weights 29 are of varying diameters and they are each provided with a central opening 56, of varying diameter, the topmost weight having the less diameter, and the smallest central opening, and the lowermost weight having the greatest diameter and the largest central opening. The sides of the openings 56 are tapered to correspond with the inclination of the inclined sides of the receiver.

While the weights are of various diameters, in order to permit proper functioning of the apparatus, all of the rings are made the same weight, in the present instance being sealed one pound each. This is accomplished by making the beads and under cut portions of the weights of various sizes so that all of the weights will have the same cubical area.

A rod 57, having its upper end threaded into the portion 55 of the receiver, and its lower end projecting through a perforated bracket 58, serves as means for limiting excessive vibration of the receiver. In order to permit the receiver to be correctly sealed with the beam, the rod 57 is provided with a balance weight cup 59.

The relative position of the receiver with respect to the weights mounted on the carrier 30 can be adjusted by turning the rods 51 and 57 in or out of their threaded connection with the receiver, so that this member can be accurately disposed to receive a weight transferred from the carrier at the correct point, whereby the weight will be properly placed on the counterpoise to coincide with the movement of the dial 26 with respect to the windows in the dial 19. In this way the movements of the movable parts of the apparatus can be synchronized.

The receiver 50 is in the nature of a counterpoise, and it functions in the same manner as the usual counterpoise heretofore employed with weigh beams. To enable the capacity of the beam to be efficiently and accurately increased or decreased, the receiver is suspended from the weigh beam so as to be coaxial with the weights 29 and the carrier 30, so that when the carrier is lowered, the weights thereon will be deposited on the receiver and thus transferred to exert their influence on the weigh beam 2.

Each weight added to the receiver increases the capacity of the beam an amount equal to one complete excursion of the indicator 20, and with nine such weights, the total capacity is ten times the original dial capacity.

In operation the weight carrier will at first usually be in its extreme elevated position with a series of nine weights thereon, each weight being such as to balance a one thousand pound load as indicated on the dial of the scale. The diameter of the central openings in the weights is such as to permit the carrier to deposit a weight on the receiver at the proper place, and the diameter of the central openings in the weights should be such that the nine weights will be supported on the receiver in equi-spaced vertical relation so that descent of the carrier for a certain amount will transfer the uppermost weight to the receiver and permit the beam to vibrate freely without being obstructed by the other weights on the carrier. Further descent of the carrier for an equal amount will transfer the next weight, and so on until all the weights have been transferred to the receiver, as is shown by Fig. 3. Similarly, on ascent, the carrier will remove the weights one by one from the receiver.

It will be observed that the design of the receiver is such that the weights will be supported thereon at three equi-distant points. The advantages of this construction will be readily apparent, and should any of the weights, when they are being transferred from the carrier to the receiver, become disarranged, they will, on engaging the inclined sides of the receiver, be righted. Thus it will be perceived that the weights will at all times be prevented from becoming axially displaced from normal operative position with the carrier or receiver.

Thus by the above described construction are accomplished among others the objects previously stated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having thus described my invention what I claim is:—

1. The combination with a weigh beam having detachable counterweights, of means for suspending the weights from the beam whereby said weights will be supported at three points.

2. The combination with a weigh beam having a counterpoise suspended therefrom and annular counterweights adapted to be deposited and removed from the said counterpoise, said counterpoise being so formed as to provide a three point support for said counterweights.

3. The combination with a weigh beam of a counterpoise therefor comprising a skeleton cone, and an additional weight for the counterpoise, said weight being in the form of a ring adapted to encircle the counterpoise and be supported at three points thereon.

4. The combination with a weigh beam, of a counterpoise therefor comprising a skeleton cone, and additional weights for the counterpoise in the form of rings of varying diameters supported at three points on said counterpoise.

5. The combination with a weigh beam, of a counterpoise therefor comprising a skeleton cone, and additional weights for the counterpoise in the form of rings of varying diameters adapted to encircle the said cone and be supported at three points thereon.

6. The combination with a weigh beam, of a counterpoise therefor comprising a skeleton cone, and additional weights for the counterpoise in the form of rings adapted to be supported on the said cone at three points and in spaced relation with each other.

7. The combination with a weigh beam having a counterpoise suspended therefrom, of a weight carrier having weights of varying diameters nested thereon, said weights being adapted to be consecutively deposited in spaced relation on the said counterpoise and be supported thereon at three points.

8. A counterpoise for weigh beams consisting of a skeleton cone adapted to support a counter weight at three points.

9. The combination with a weigh beam having detachable counterweights, of a skeleton cone adapted to suspend said counterweights, means for successively depositing weights, means for said counterweights on said cone, means for said counterweight, depositing means, dampening said weight, depositing means, and a shaft for operating both said means.

10. In a device of the character described, a main dial having graduations marked thereon and a series of circumferentially-spaced openings therein arranged adjacent the graduations, an indicating hand cooperating with the dial to indicate weights, an auxiliary dial mounted behind said main dial and bearing series of numerals arranged to be displayed serially through said openings, load-offsetting means connected and arranged to actuate the indicating hand, including a scale beam, a series of counter weights, supported at three points and arranged to be serially connected to said scale beam, and means for moving said auxiliary dial to increase the numerals shown through the openings in said main dial as the counter weights are connected to the scale beam.

11. In a device of the character described, a circular main dial provided with a set of weight indicating characters extending substantially around the periphery thereof, an indicator centrally mounted with respect to said main dial and adapted to coact with the characters thereon to indicate a weight, balancing means having connection for operating said indicator, an auxiliary circular dial provided with a set of index characters adapted to coact with the characters on the said main dial to indicate a weight, and radially adjustable means controlled by counterpoising for partially rotating said auxiliary second dial, thereby changing the indices of the weight indicating characters on the main dial.

12. In a device of the character described, a circular stationary main dial carrying weight indicating characters, an auxiliary rotatable circular index carrying indices for the characters of said stationary main dial, counterpoising means, and variably disposed means controlled by the counterpoising means for rotating said auxiliary index dial to change the reading of said main dial.

13. In a device of the character described, the combination of a stationary main dial with figures thereon, a pointer and connections so arranged that the pointer will indicate upon the main dial the load upon the scale, a movable auxiliary dial having series of figures thereon in juxtaposition to the first mentioned figures, a movable carrier and counterpoise supported thereon, connections between said movable auxiliary dial and said movable carrier, means for normally holding the said auxiliary dial and carrier against movement, a pendant suspended from said pointer connections and located near said carrier, whereby the carrier when released will transfer a counterpoise to said pendant at three points of support thereon and the movable auxiliary dial will move in unison with said carrier to bring the proper figure adjacent a stationary figure substantially as specified.

14. In a device of the character described, the combination of an indicator having a stationary main dial with a series of figures thereon and a revolvable auxiliary dial having a series of figures adjacent the first mentioned figures, said stationary main dial having windows adjacent the figures thereon, a plurality of supplemental counterbalances, means for moving said counterbalances, and adjustable means connecting said supplemental counterbalances with the revolvable auxiliary dial, whereby a plurality of figures indicating the amount of said counterbalance will appear through said windows for the purpose specified.

15. The combination of a load receiver, a beam, a counterbalance normally connected to said beam, and an indicating device, comprising an automatic pendulum scale for weighing loads applied to said receiver, with a supplemental counterbalancing device comprising a supplemental rigid supporting member, and a plurality of counterbalances supported thereby, means for normally holding said supporting device, and means for releasing said device for applying at three points of support automatically additional counterbalances to said beam, substantially as specified.

16. In a device of the character described, in connection with a pivoted beam, a weight receiver connected to said beam, and a weight support adjacent said weight receiver but detached therefrom, weights normally in said weight support, a holding device for said support, manually operated means for said holding device, said holding device including a latch connected to said manually operated means to hold said support until the holding mechanism is released, and an automatically operated holding mechanism connected with and operated by said beam when in one position to release said weights successively from the said weight receiver and in another position to engage said weight support and prevent the further movement of said weights as set forth.

17. In a device of the character described, having a primary counter balancing device and supplemental counterbalancing devices, means for holding same normally inactive but adapted to become active by means influenced by the load so as to add at equi-distant three point supports sufficient counterbalances to counterbalance the load, a tripping device forming a part of said means, and a supplemental tripping device adapted to operate the main tripping device, as and for the purpose specified.

18. In a weighing scale, the combination of an automatic pendulum, a dial scale with a supplemental weighing scale normally disconnected from the first mentioned scale, consisting of a movable support normally held in its extreme upper position, but adapted to move downwardly, a plurality of counterbalancing weights on said support, removably held thereon and supported at three points of support, and manually operated means for arresting the said support and holding same against further movement, whereby proper counterbalance will be shifted from said support to said first mentioned dial scale.

19. In a device of the character described, the combination of a load supporting element, a main counterbalance for said element, a supplemental counterbalancing-device comprising a gravity-operated carrier and a plurality of weights normally supported thereon, a ratchet and pawl device located in proximity to the carrier, and a flexible chain for connecting the carrier to the ratchet whereby upon the release of the pawl the ratchet will be operated by the downward movement of the carrier to transfer automatically at successive, spaced intervals the weights onto the load supporting element at three points of support thereon, for the purposes specified.

20. In a dial scale having means for changing the capacity through successive ranges, a movable dial bearing a plurality of series of numbers, the corresponding terms in the several series representing total weight values in front of the movable dial adapted to expose only the corresponding terms of the series of numbers, and gear connections including an adjustable intermediate gear member connection actuated by the first named means for positioning the movable dial to expose the proper numbers for each range of capacity of the scale.

21. In a weighing scale, in combination, a vertically movable weight receiver and an upwardly and downwardly movable weight carrier adapted to co-operate to effect transfer of weights from said carrier to said receiver on downward movement of said carrier at successive, spaced three points of support and from said receiver to said carrier on upward movement of said carrier, and a plurality of superposed weights of different diameters co-operatively associated with said carrier and said receiver, said receiver and said carrier including weight guides alternating with each other around the axis of movement.

22. In a device of the character described, a weigh beam, a series of detachable counterweights suspended therefrom, means for holding the said counterweights at three points of support in a carrier co-operating therewith, and means for coaxially aligning and maintaining the said counterweights in their operative positions on the said carrier.

23. In a device of the character described, a weigh beam, a series of detachable counterweights pendant therefrom and support means for the said counterweights adapted to hold the counterweights at three points of support and in successive equi-distant spaced vertical operative positions.

24. In a device of the character described, a weigh beam provided with a counterpoise comprising a skeleton cone and a plurality of counterweights normally disposed on a carrier in pyramidal interfitting relation and operatively co-operating with the said cone, the said counterweights being annular in form and adapted to encircle the said counterpoise and be supported thereon at three points of support.

25. In a device of the character described, a main dial, an auxiliary dial co-operating with the main dial, counterpoising means, and means controlled by the counterpoising means for rotating the said auxiliary dial comprising a plurality of gears, and intermediate variable gear means, therefor, operatively connected to the said auxiliary dial and the counterpoising means.

26. In a device of the character described, a main dial, an auxiliary dial co-operating with the main dial, counterpoising means, and means controlled by the counterpoising means for rotating the said auxiliary dial comprising a gear segment carried by the said auxiliary dial, a gear operatively connected to the counterpoising means, and a pivotally mounted intermediate gear member provided with upper and lower gear segments adjustably mounted thereon, the upper gear segment engaging the gear segment of the said auxiliary dial and the lower gear segment the gear operatively connected to the counterpoising means.

27. In a device of the character described, a main dial, an auxiliary dial co-operating with the main dial, counterpoising means, and means controlled by the counterpoising means for rotating the said auxiliary dial comprising a gear segment carried by the said auxiliary dial, a gear operatively connected to the counterpoising means, and a pivotally mounted intermediate gear member provided with transverse end portions having slots therein, upper and lower gear segments adjustably mounted thereon by bolts inserted in the said slots, the upper gear segment engaging the gear segment of the said auxiliary dial and the lower gear segment the gear operatively connected to the counterpoising means.

28. In a device of the character described, in combination, a main dial mounted on a shaft, an auxiliary dial coaxially mounted with the said main dial on a spider rotatively mounted on the said main dial shaft, a weigh beam provided with detachable counterweights, means for successively depositing the said counterweights thereon and thereby increasing the capacity proportionally, rotatable control means for the said counterweight depositing means, and means operatively connected with the counterweight depositing means for rotating the said auxiliary dial in accordance with the varying counterweights, comprising a gear segment formed on a portion of the said spider and adapted to co-operate with an elongated intermediate gear member, carrying at its upper end a gear segment engaging the said spider gear segment and having at its lower end a gear segment engaging a pinion carried by the said control means, whereby as the said control means is rotated and the counterweights are deposited the auxiliary dial is adapted to be rotated in unison therewith.

29. In a device of the character described, in combination, a main dial provided around its periphery with a series of weight indicating numbers and having a series of windows therein, an auxiliary dial disposed behind the main dial and co-operating therewith, a weigh beam having detachable counterweights, means for successively depositing the said counterweights thereon and thereby increasing the capacity proportionally, gear means carried by the said auxiliary dial, an elongated, pivotally mounted intermediate gear member having upper and lower gear segments, control means operatively connected to the said counterweight depositing means and the lower gear segment of the said intermediate gear member, the upper gear segment of which is operatively engaged with the gear operating means of the said auxiliary dial, and a plurality of grouped series of numbers disposed around the periphery of the auxiliary dial and so spaced at uniform intervals from each other that corresponding numbers of each series will be displayed consecutively through their respective windows as the auxiliary dial is rotated, whereby the respective indications on the auxiliary disc as each counterweight is brought into operative position will indicate the particular increased capacity corresponding to the respective counterweight.

In testimony whereof I hereunto sign my name this 18th day of March, 1926.

MORTON H. STARR.